United States Patent [19]

Bachelder

[11] Patent Number: 5,974,169

[45] Date of Patent: Oct. 26, 1999

[54] MACHINE VISION METHODS FOR DETERMINING CHARACTERISTICS OF AN OBJECT USING BOUNDARY POINTS AND BOUNDING REGIONS

[75] Inventor: Ivan A. Bachelder, Newton, Mass.

[73] Assignee: Cognex Corporation, Natick, Mass.

[21] Appl. No.: 08/820,870

[22] Filed: Mar. 20, 1997

[51] Int. Cl.[6] ....................................................... G06K 9/00
[52] U.S. Cl. ........................... 382/151; 382/199; 382/286
[58] Field of Search ..................................... 382/151, 254, 382/141, 145, 147, 199, 286, 288, 291; 364/570; 348/87–89, 124–126

[56] References Cited

U.S. PATENT DOCUMENTS

| | | |
|---|---|---|
| 3,816,722 | 6/1974 | Sakoe et al. . |
| 3,936,800 | 2/1976 | Ejiri et al. . |

(List continued on next page.)

FOREIGN PATENT DOCUMENTS

| | | |
|---|---|---|
| 0 527 632 A2 | 2/1993 | European Pat. Off. . |
| WO 95/122137 | 8/1995 | WIPO . |
| WO 95/21376 | 8/1995 | WIPO . |
| WO 97/21189 | 6/1997 | WIPO . |
| WO 97/22858 | 6/1997 | WIPO . |
| WO 97/24692 | 7/1997 | WIPO . |
| WO 97/24693 | 7/1997 | WIPO . |

OTHER PUBLICATIONS

Grison, W. Eric L. and Huttenlocher, Daniel P., "On the Sensitivity of the Hough Transform for Object Recognition", May 1990, IEEE Transactions on Pattern Analysis and Machine Intelligence, vol. 12, No. 3.

Medina–Mora et al. (1981) An Incremental Programming Environment, IEEE Transactions on Software Eng. SE–7:472–482.

Teitelbaum et al. (19810 The Cornell Program Synthesizer: A Syntax–Directed Programming Environment, Communications of the ACM 24:563–573.

Newsletter from Acquity Imaging, Inc., "Remote Vision Support Package—The Phones Are Ringing!," 1 page.

PictureTel Corporation Product Brochure "PictureTel Live PCS 100(tm) Personal Visual Communications System," 3 pp. (1993).

PictureTel Corporation Product Brochure "PictureTel System 1000: Complete Videoconferencing for Cost Sensitive Applications," 4 pp. (1993).

PictureTel Corporation Product Brochure, "PictureTel System 4000(tm) A Family of Models to Fit Your Application From Offices to Boardrooms, Classrooms, and Auditoriums," 4 pp. (1993).

(List continued on next page.)

*Primary Examiner*—Leo H. Boudreau
*Assistant Examiner*—Bhavesh Mehta
*Attorney, Agent, or Firm*—David J. Powsner

[57] ABSTRACT

Machine vision methods for determining a characteristic (such as position, orientation, size, center of mass, and boundary) of an object in an image include finding points in the image on the boundary of the object; identifying bounding boxes, or regions, in the image that correspond to edges of the object; and labeling boundary points to denote which respective edges, if any, to which they belong based on (i) the locations and orientations of those points, and (ii) locations of the plural bounding boxes. Points apparently lying on a boundary of the object, but outside a bounding box, can be ignored—and, more particularly, are denoted as not corresponding to an edge. Likewise, apparent boundary points lying within a bounding box, but at an angle not associated with the corresponding to the respective edge of the object, can also be ignored. Characteristics of the imaged object are determined as a function of those boundary points found to correspond to an edge of the object (e.g., points lying within a bounding box, at the expected angle, and not too far from a line connecting similarly situated points). Characteristics of the object, such as position, orientation, size, center of mass, and boundary points, can be determined in the image reference frame.

26 Claims, 6 Drawing Sheets

U.S. PATENT DOCUMENTS

| | | |
|---|---|---|
| 3,967,100 | 6/1976 | Shimomura . |
| 3,968,475 | 7/1976 | McMahon . |
| 3,978,326 | 8/1976 | Shimomura . |
| 4,011,403 | 3/1977 | Epstein et al. . |
| 4,115,702 | 9/1978 | Nopper . |
| 4,115,762 | 9/1978 | Akiyama et al. . |
| 4,183,013 | 1/1980 | Agrawala et al. . |
| 4,200,861 | 4/1980 | Hubach et al. . |
| 4,254,400 | 3/1981 | Yoda et al. . |
| 4,300,164 | 11/1981 | Sacks . |
| 4,385,322 | 5/1983 | Hubach et al. . |
| 4,441,124 | 4/1984 | Heebner et al. . |
| 4,441,206 | 4/1984 | Kuniyoshi et al. . |
| 4,534,813 | 8/1985 | Williamson et al. . |
| 4,541,116 | 9/1985 | Lougheed . |
| 4,570,180 | 2/1986 | Baier et al. . |
| 4,577,344 | 3/1986 | Warren et al. . |
| 4,581,762 | 4/1986 | Lapidus et al. . |
| 4,606,065 | 8/1986 | Beg et al. . |
| 4,617,619 | 10/1986 | Gehly . |
| 4,630,306 | 12/1986 | West et al. . |
| 4,641,349 | 2/1987 | Flom et al. ............................ 382/115 |
| 4,688,088 | 8/1987 | Hamazaki et al. . |
| 4,706,168 | 11/1987 | Weisner . |
| 4,707,647 | 11/1987 | Coldren et al. ....................... 318/568 |
| 4,728,195 | 3/1988 | Silver . |
| 4,730,260 | 3/1988 | Mori et al. . |
| 4,731,858 | 3/1988 | Grasmueller et al. . |
| 4,736,437 | 4/1988 | Sacks et al. . |
| 4,742,551 | 5/1988 | Deering . |
| 4,764,870 | 8/1988 | Haskin . |
| 4,771,469 | 9/1988 | Wittenburg . |
| 4,783,826 | 11/1988 | Koso . |
| 4,783,828 | 11/1988 | Sadjadi . |
| 4,783,829 | 11/1988 | Miyakawa et al. . |
| 4,831,580 | 5/1989 | Yamada . |
| 4,860,374 | 8/1989 | Murakami et al. . |
| 4,860,375 | 8/1989 | McCubbrey et al. . |
| 4,876,457 | 10/1989 | Bose . |
| 4,876,728 | 10/1989 | Roth . |
| 4,891,767 | 1/1990 | Rzasa et al. ............................ 364/513 |
| 4,903,218 | 2/1990 | Longo et al. . |
| 4,907,169 | 3/1990 | Lovoi ..................................... 364/513 |
| 4,914,553 | 4/1990 | Hamada et al. . |
| 4,922,543 | 5/1990 | Ahlbom et al. . |
| 4,926,492 | 5/1990 | Tanaka et al. . |
| 4,932,065 | 6/1990 | Feldgajer . |
| 4,953,224 | 8/1990 | Ichinose et al. . |
| 4,955,062 | 9/1990 | Terui . |
| 4,959,898 | 10/1990 | Landman et al. . |
| 4,962,423 | 10/1990 | Yamada et al. . |
| 4,972,359 | 11/1990 | Silver et al. . |
| 4,980,971 | 1/1991 | Bartschat et al. ....................... 29/833 |
| 4,982,438 | 1/1991 | Usami et al. . |
| 5,012,402 | 4/1991 | Akiyama . |
| 5,046,190 | 9/1991 | Daniel et al. . |
| 5,054,096 | 10/1991 | Beizer . |
| 5,060,276 | 10/1991 | Morris et al. . |
| 5,063,608 | 11/1991 | Siegel . |
| 5,073,958 | 12/1991 | Imme . |
| 5,081,656 | 1/1992 | Baker et al. . |
| 5,081,689 | 1/1992 | Meyer et al. . |
| 5,086,478 | 2/1992 | Kelly-Mahaffey et al. . |
| 5,090,576 | 2/1992 | Menten . |
| 5,091,861 | 2/1992 | Geller et al. . |
| 5,091,968 | 2/1992 | Higgins et al. . |
| 5,093,867 | 3/1992 | Hori et al. . |
| 5,113,565 | 5/1992 | Cipolla et al. . |
| 5,115,309 | 5/1992 | Hang . |
| 5,119,435 | 6/1992 | Berkin . |
| 5,124,622 | 6/1992 | Kawamura et al. . |
| 5,133,022 | 7/1992 | Weideman . |
| 5,134,575 | 7/1992 | Takagi . |
| 5,143,436 | 9/1992 | Baylor et al. . |
| 5,145,432 | 9/1992 | Midland et al. . |
| 5,151,951 | 9/1992 | Ueda et al. . |
| 5,153,925 | 10/1992 | Tanioka et al. . |
| 5,155,775 | 10/1992 | Brown ..................................... 382/100 |
| 5,159,281 | 10/1992 | Hedstrom et al. . |
| 5,159,645 | 10/1992 | Kumagai . |
| 5,164,994 | 11/1992 | Bushroe . |
| 5,168,269 | 12/1992 | Harlan . |
| 5,185,855 | 2/1993 | Kato et al. . |
| 5,189,712 | 2/1993 | Kajiwara et al. . |
| 5,206,820 | 4/1993 | Ammann et al. . |
| 5,216,503 | 6/1993 | Paik . |
| 5,225,940 | 7/1993 | Ishii et al. . |
| 5,230,027 | 7/1993 | Kikuchi . |
| 5,243,607 | 9/1993 | Masson et al. . |
| 5,253,306 | 10/1993 | Nishio . |
| 5,253,308 | 10/1993 | Johnson . |
| 5,265,173 | 11/1993 | Griffin et al. . |
| 5,271,068 | 12/1993 | Ueda et al. . |
| 5,287,449 | 2/1994 | Kojima . |
| 5,297,256 | 3/1994 | Wolstenholme et al. . |
| 5,299,269 | 3/1994 | Gaborski et al. . |
| 5,311,598 | 5/1994 | Bose et al. . |
| 5,315,388 | 5/1994 | Shen et al. . |
| 5,319,457 | 6/1994 | Nakahashi et al. . |
| 5,327,156 | 7/1994 | Masukane et al. . |
| 5,337,267 | 8/1994 | Colavin . |
| 5,363,507 | 11/1994 | Nakayama et al. . |
| 5,367,439 | 11/1994 | Mayer et al. . |
| 5,367,667 | 11/1994 | Wahlquist et al. . |
| 5,371,690 | 12/1994 | Engel et al. ............................ 364/570 |
| 5,388,197 | 2/1995 | Rayner . |
| 5,388,252 | 2/1995 | Dreste et al. . |
| 5,398,292 | 3/1995 | Aoyama . |
| 5,432,525 | 7/1995 | Maruo et al. . |
| 5,440,699 | 8/1995 | Farrand et al. . |
| 5,455,870 | 10/1995 | Sepai et al. . |
| 5,455,933 | 10/1995 | Schieve et al. . |
| 5,475,766 | 12/1995 | Tsuchiya et al. . |
| 5,477,138 | 12/1995 | Efjavic et al. . |
| 5,481,712 | 1/1996 | Silver et al. . |
| 5,485,570 | 1/1996 | Bushboom et al. . |
| 5,491,780 | 2/1996 | Fyles et al. . |
| 5,495,424 | 2/1996 | Tokura . |
| 5,495,537 | 2/1996 | Bedrosian et al. . |
| 5,506,682 | 4/1996 | Pryor ..................................... 356/375 |
| 5,519,840 | 5/1996 | Matias et al. . |
| 5,526,050 | 6/1996 | King et al. . |
| 5,532,739 | 7/1996 | Garakani et al. . |
| 5,550,763 | 8/1996 | Michael . |
| 5,557,690 | 9/1996 | O'Gorman et al. .................... 382/151 |
| 5,566,877 | 10/1996 | McCormack . |
| 5,568,563 | 10/1996 | Tanaka et al. . |
| 5,574,668 | 11/1996 | Beaty . |
| 5,574,801 | 11/1996 | Collet-Beillon . |
| 5,583,949 | 12/1996 | Smith et al. ............................ 382/199 |
| 5,583,954 | 12/1996 | Garakani . |
| 5,592,562 | 1/1997 | Rooks . |
| 5,594,859 | 1/1997 | Palmer et al. . |
| 5,602,937 | 2/1997 | Bedrosian et al. . |
| 5,608,872 | 3/1997 | Schwartz et al. . |
| 5,640,199 | 6/1997 | Garakani et al. . |
| 5,640,200 | 6/1997 | Michael . |
| 5,696,848 | 12/1997 | Patti et al. ............................. 382/254 |
| 5,761,326 | 6/1998 | Brady et al. ........................... 382/103 |
| 5,872,870 | 2/1999 | Michael .................................. 382/291 |

OTHER PUBLICATIONS

Symantec Corporation, "The Norton pcAnywhere User's Guide," Table of Contents 8 pp; Introduction of pcAnywhere Technology pp. i–vii; Chapter 7—Sessions; pp. 191–240 (1991).

Bursky, Dave, "CMOS Four–Chip Set Process Images at 20–MHz Data Rates," Electronic Design, May 28, 1987, pp. 39–44.

Plessey Semiconductors, Preliminary Information, May 1986, Publication No. PS2067, May 1986, pp. 1–5.

NEC ELectronics Inc., PD7281 Image Pipelined Processor, Product Information Brochure, pp. 2–169–2–211.

Horn, Berthold Klaus Paul. "Robot Vision", The Massachusetts Institute for Technology, 1986.

Rosenfeld, Azriel. "Computer Vision: Basic Principles," Proceedings of the IEEE. vol. 76, No. 8, Aug. 1988. pp. 863–868.

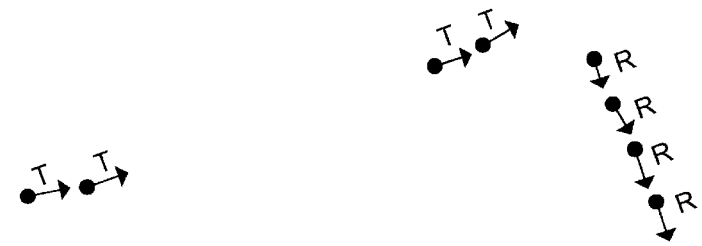
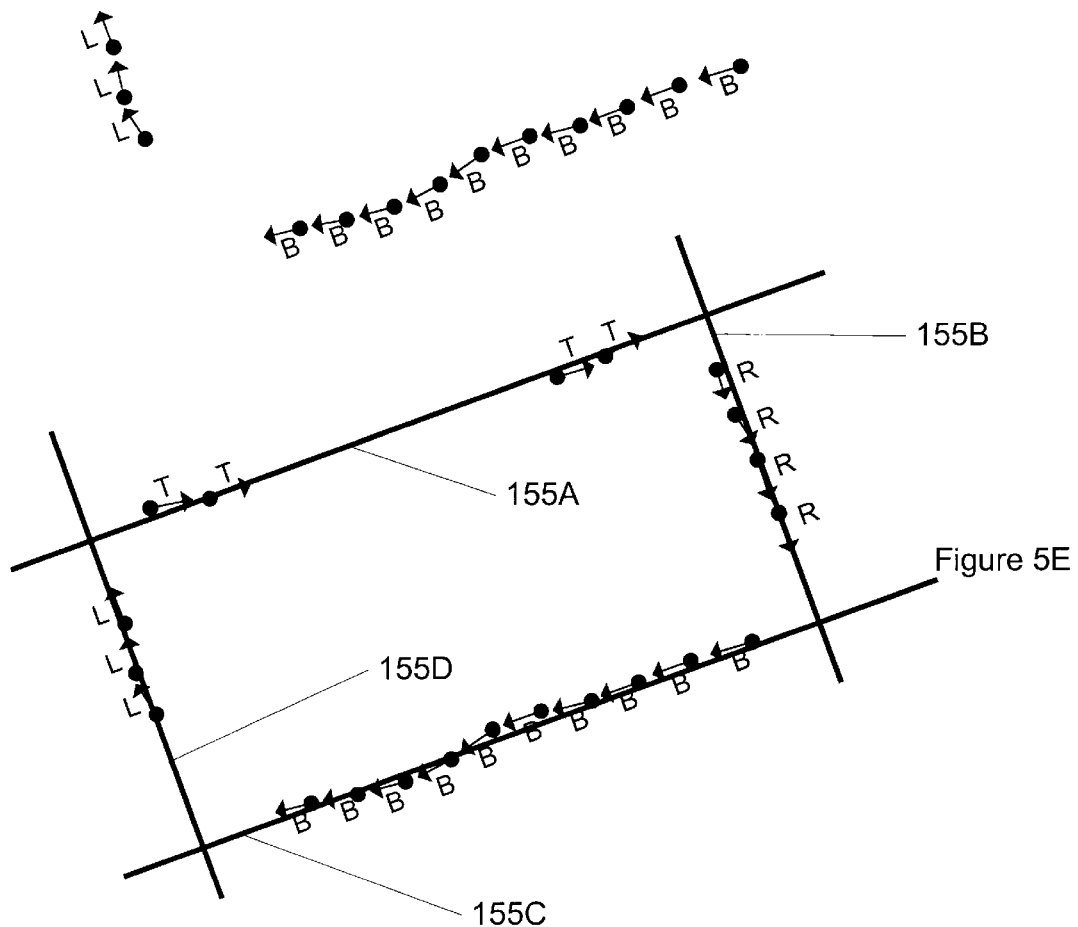
Figure 5D
Figure 5E

MACHINE VISION METHODS FOR DETERMINING CHARACTERISTICS OF AN OBJECT USING BOUNDARY POINTS AND BOUNDING REGIONS

BACKGROUND OF THE INVENTION

The invention pertains to machine vision and, more particularly, to methods for determining characteristics of an object represented in an image. The invention has application inter alia in the machine inspection of back-lit objects, such as semiconductor chip surface mounted devices.

Machine vision refers to the automated analysis of an image to determine characteristics of objects and other features shown therein. It is often employed in automated manufacturing lines, where images of components are analyzed to determine placement and alignment prior to assembly. Machine vision is also used for quality assurance. For example, in the pharmaceutical and food packing industries, images of packages are analyzed to insure that product labels, lot numbers, "freshness" dates, and the like, are properly positioned and legible.

In many machine vision applications, it is often essential to identify the boundaries of objects in images. In the semiconductor industry, for example, semiconductor chip surface mounted devices (SMDs) must be precisely positioned and oriented before they can be soldered into place on a printed circuit board. Typically, those components are "back-lit," i.e., illuminated from behind such that images of only their silhouettes are presented for machine vision analysis.

The machine vision analysis of back-lit SMDs can be difficult because the visual features (e.g., edge points) presented in their images must be matched to internal models of the components. This is necessary to permit determination of accurate transformations from model to physical coordinates (i.e., the physical position of the SMD). The process must be fast, moreover, so that an automated surface mounter can inspect and place each device on the board quickly. It must also be accurate enough to insure that chip leads substantialy contact pads on the board.

This problem may be complicated further by extraneous structures in the images. Like other delicate electronic components, SMDs are typically manipulated during assembly by suction nozzles. These small vacuum tips are used to pick the chips out of bins, present them for inspection to the machine vision camera, and place them on boards. Although the nozzles are usually arranged to pick up the SMDs from behind, they sometimes cast shadows or protrude beyond the edges of the chips, resulting in silhouettes that interfere with determination of chip location, orientation and other characteristics.

Other complications arise from the lighting conditions. Often, back-lighting will cause the otherwise rectangular chips to appear as if they have rounded comers. Image features extracted around these comer points do not accurately reflect the physical structure of the chip and, hence, also confound inspection.

Still further, as with other manufactured devices, each SMD has a slightly different size and shape than the others. Although each chip must satisfy a set of manufacturing specifications, e.g., width and length tolerances, there is no guarantee that chip corners will be sharp, nor that edges be completely straight.

An object of this invention is to provide improved machine vision methods and, particularly, improved methods for determining characteristics of an object in an image.

A further object is to provide such methods as permit the rapid determination of characteristics, such as dimensions, position, and orientation, of rectilinear and other polygonal objects.

Still another object is to provide such methods as can be adapted for use in analyzing images of back-lit objects.

Yet still another object is to provide such methods as can be readily implemented on conventional digital data processors or other conventional machine vision analysis equipment.

Yet still another object of the invention is to provide such methods that can rapidly analyze images without undue consumption of computational resources.

SUMMARY OF THE INVENTION

The foregoing objects are among those met by the invention which provides, in one aspect, a method of determining a characteristic (such as position, orientation, size, center of mass, or boundary) of an object in an image. The method includes finding points in the image on the boundary of the object. The method further includes identifying bounding boxes, or regions, in the image that correspond to edges of the object. For a rectilinear object, for example, this includes a bounding box for each of the top, bottom, left and right edges of the object. The boundary points in the image are labeled to denote the respective edges to which they belong based on (i) the locations and orientations of those points, and (ii) locations of the plural bounding boxes.

In a related aspect, the invention provides a method as described above in which points apparently lying on a boundary of the object, but outside a bounding box, are ignored—and, more particularly, are denoted as not corresponding to an edge. Likewise, apparent boundary points lying within a bounding box, but at an angle not associated with the corresponding to the respective edge of the object, are ignored. For example, points lying at the top of a rectilinear object (e.g., an SMD chip) are expected to lie at 0° (or 180°) to their neighbors with respect to a rough estimate of the position of the object in the image. If a boundary point in an image of such an object lies within the bounding box corresponding to the top of the object, yet is oriented at an angle other than substantially 0° or 180°, that point is ignored.

In still further related aspects of the invention, the method ignores apparent boundary points that lie within a bounding box and at the expected angle, yet reside too far from a line connecting points associated with the same edge. For example, the method can fit a line (e.g., using a least squares technique) to image points that apparently correspond to the top edge of a rectilinear object, i.e., points that lie within the bounding box corresponding to that edge and that lie at the angle associated with that edge (0° or 180°) with respect to the coarse estimate of the position of the object in the image. Any of those points lying more than a specified distance, e.g., three standard deviations, from the edge are ignored.

Other aspects of the invention provide methods as described above in which characteristics of the imaged object are determined as a function of those boundary points found to correspond to an edge of the object (e.g., points lying within a bounding box, at the expected angle, and not too far from a line connecting similarly situated points). Characteristics of the object, such as position, orientation, size, center of mass, and boundary points, can be determined in the image reference frame.

In a preferred aspect, those characteristics are determined in the physical reference frame of the object itself. To this end, the method can use point-line correspondences to fit to the boundary points to respective edges of a model of the object. Once the points are fit to the model (i.e., transformed from the image reference frame to the physical reference frame), they are used in appropriate characteristic-determining calculations.

Other aspects of the invention provide methods as described above including the steps of determining, e.g., using standard machine vision tools, a coarse location of the object in the image and an estimate of uncertainty of that determination. That coarse location can be, for example, the center of mass of the object in the image. The uncertainty estimate can be based on characteristics of features in the image other than the object itself. Those characteristics can be, for example, a pickup nozzle (or shadow thereof) that appear in the image along with the object. The uncertainty estimate can also be based on variations in the size of the object that are not related to imaging, e.g., expected variances resulting from manufacturing tolerances. The bounding boxes in the image are determined as a function of the coarse location and the estimate.

The invention has application in a wide variety of industrial, manufacturing, and production environments. It facilitates fitting boundaries found in an image to edges of the corresponding real-world objects, thereby improving the speed and accuracy of analysis of objects under inspection. Thus, for example, a machine vision system utilzing the invention can be used to find and position quickly objects on an assembly line.

BRIEF DESCRIPTION OF THE DRAWINGS

A more complete understanding of the invention may be attained by reference to the drawings, in which

FIGS. 5A–5E depict further details as to application of the invention in identifying boundary points of a rectilinear object through use of bounding boxes that accomodate manufacturing tolerances, positional uncertainty from coarse location, and positional uncertainty from extraneous objects(such as a pick-up nozzle) in the image.

DETAILED DESCRIPTION OF THE ILLUSTRATED EMBODIMENT

Figure 1:
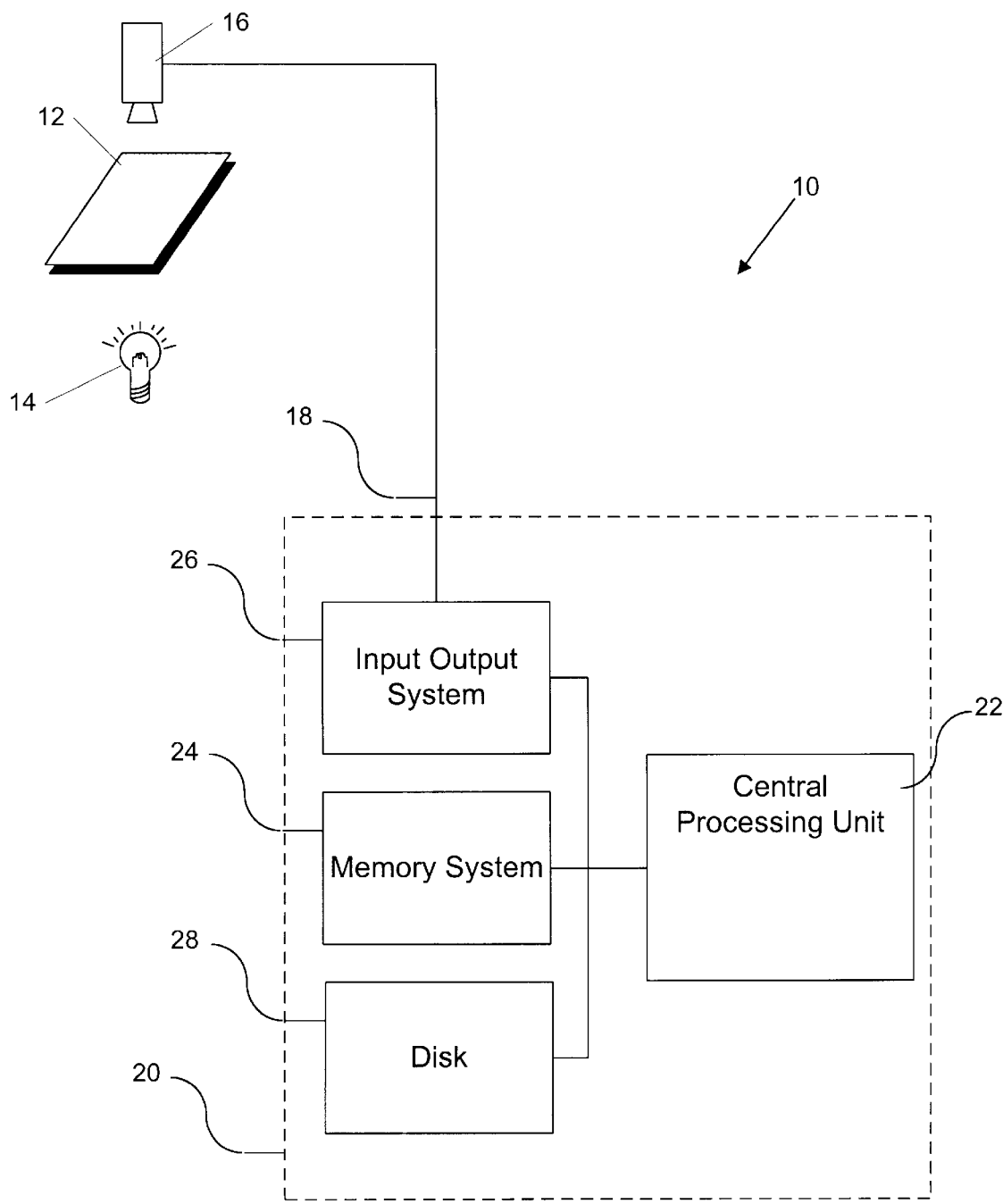
FIG. 1 depicts a machine vision system for practice of the invention.

FIG. 1 illustrates a machine system 10 of the type in which the invention is practiced. The system 10 includes a capturing device 16, such as a conventional video camera or scanner, that generates an image of an object 12 that is back-lit by illumination source 14. Image data (or pixels) generated by the capturing device 16 represent, in the conventional manner, the image intensity (e.g., color or brightness) of each point in the scene at the resolution of the capturing device 16.

The object 12 can be, for example, a surface mounted device (SMD) that is manipulated by a robot arm and suction nozzle (not shown) of the type commonly used in the art to move SMDs and other small electronic devices. Object 12 can be, of course, any other object susceptible to inspection by machine vision. It can also be illuminated from the front or in any other manner.

The digital image data is transmitted from capturing device 16 via a communications path 18 to an image analysis system 20. This can be a conventional digital data processor, or a vision processing system of the type commercially available, e.g., from the assignee hereof (Cognex Corporation) programmed in accord with the teachings herein.

The image analysis system 20 may have one or more central processing units 22, main memory 24, input-output system 26, and disc drive (or other mass storage device) 28, all of the conventional type.

The system 20 and, more particularly, central processing unit 22, is configured by programming instructions according to the teachings herein for determining characteristics of an object shown in image acquired by capturing device 16, as described in further detail below. Those skilled in the art will appreciate that, in addition to implementation on a programmable digital data processor, the methods and apparatus taught herein can be implemented in special purpose hardware.

Figure 2:
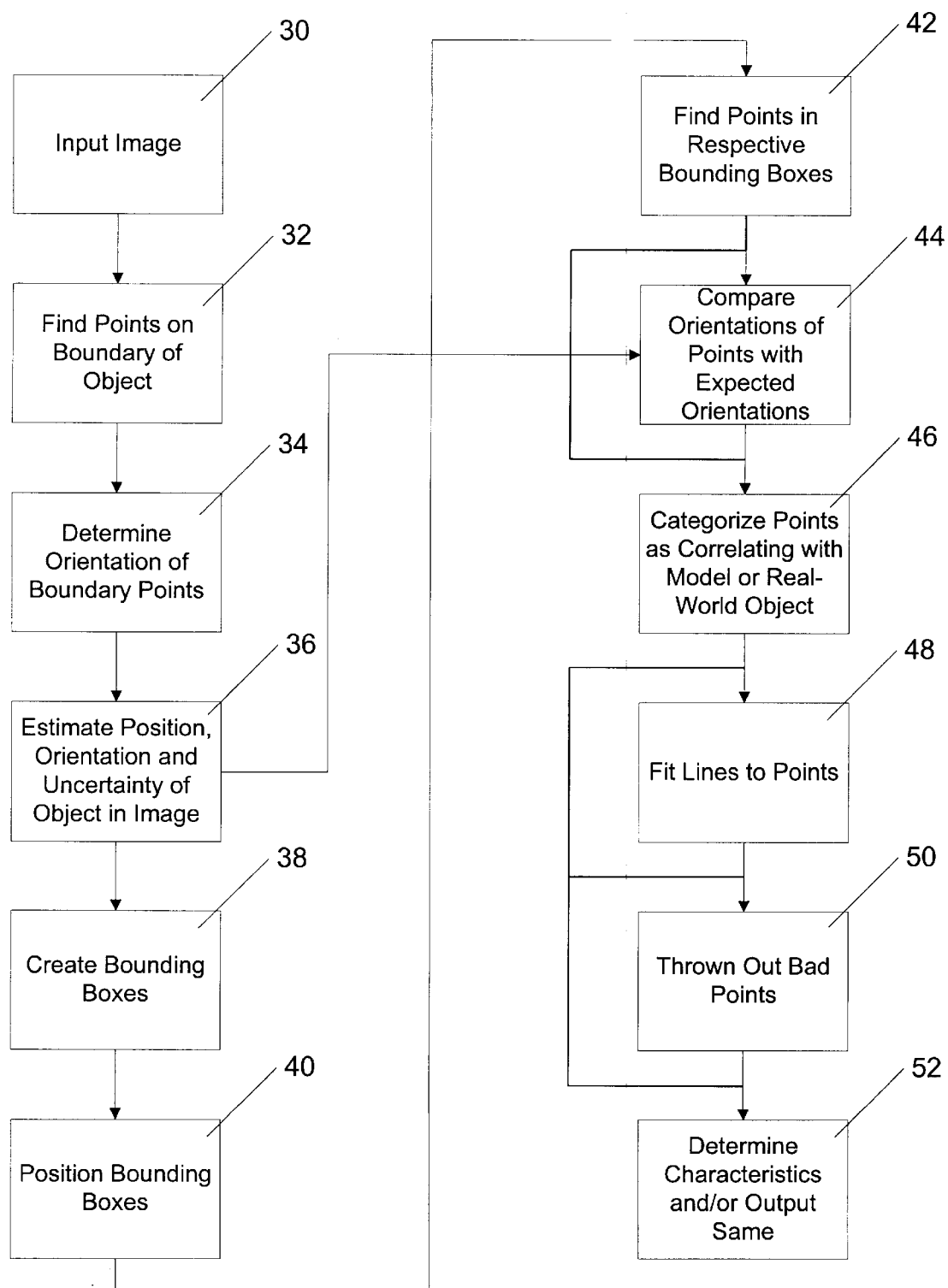
FIG. 2 is a flow chart summarizing operation of a method according to the invention for determining characteristics of an object in an image.

FIG. 2 is a flow chart summarizing operation of a method according to the invention for determining characteristics of an object in an image. In step 30, the method inputs an image depicting an object whose characteristics are to be determined. The image can be acquired real-time by capturing device 16, retrieved from storage device 28, or otherwise obtained in any manner known in the art.

Figure 3A:
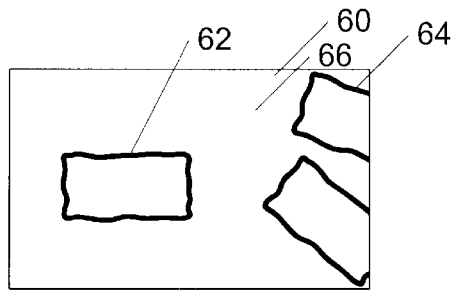
FIGS. 3A–3F depict application of the invention in identifying boundary points of a rectilinear object through use of bounding boxes that accomodate manufacturing tolerances in the object.

One such image is depicted by element 60 of FIG. 3A, showing a generally rectangular object 62. In the illustrated embodiment, object 62 represents a back-lit SMD chip. The deviations of the illustrated object 62 from a true rectangular form are intended to reflect preturbations on the object boundary resulting from manufacturing tolerances, image capture and image processing.

Figure 4A:
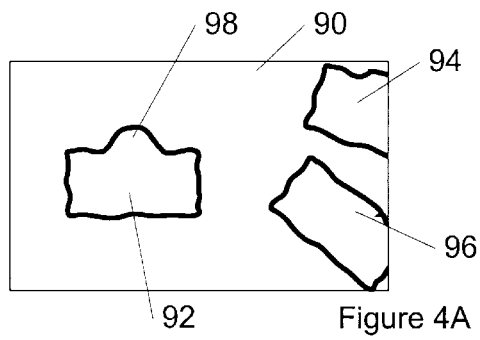
FIGS. 4A–4H depict application of the invention in identifying boundary points of a rectilinear object through use of bounding boxes that accomodate manufacturing tolerances in the object and positional uncertainty from coarse location.

Another such image is depicted by element 90 of FIG. 4A, which also shows a generally rectangular object and, more particularly, a back-lit SMD chip 92. In addition to the deviations resulting from manufacturing tolerances, image capture, and image processing, that drawing also shows the effect that another object 98 in the image can have on the object of interest 92.

Particularly, in the image, element 92 is shown as being virtually indistinguishable from element 98, which in the illustrated embodiment represents a suction nozzle used to pick-up the chip 92. Though such a nozzle 98 would, optimally, always be fully obscured by the silhouette of chip 92, in actual operation that is not always the case. Instead, the nozzle sometimes does not pick up a chip 92 on center and, hence, a portion of the nozzle silhouette protrudes beyond the extent of the chip 92 in a manner that can not be distinguished from the actual boundary of the chip 92 by prior art machine vision techniques such as thresholding.

Although the illustrated embodiment concerns generally rectangular objects and, particularly, SMD chips, those skilled in the art will appreciate that the invention is not so limited. Rather, it can be applied to determining the characteristics of the objects of any polygonal shape (e.g., triangular, pentagonal, octagonal, etc.). Likewise, the invention is not limited to removing the confounding effects of suction nozzles 98 but, rather, can remove the effects of virtually any additional objects in an image that can be distinguished in the manner described below.

In steps 32–36, the method ascertains the coarse, or rough, location and orientation of the object using conventional machine vision tools. Thus, in step 32, the method finds the points on the boundary of the object in the image. For example, it can find points on the boundary of object 62, as well as those on the boundary of the "composite" object 92/98. This can be performed using any conventional boundary tracking vision tool, such as those commercially available in the marketplace or disclosed in Ballard et al, *Computer Vision*, (Prentice-Hall 1982) at Chapter 4 ("Boundary Detection), the teachings of which are incorporated herein by reference. Preferably, this step is performed using a boundary tracking vision tool of the type commercially available from the assignee hereof (Cognex Corporation).

In step 34, the method determines the orientations of points on the boundary of the object in the image, e.g., object 62 and composite object 92/98. This too can be performed using any conventional boundary tracking vision tool, such as those commercially available in the marketplace or disclosed in Ballard et al, supra, at Chapter 4. Preferably, this step is performed using an angle finding vision tool of the type commercially available from the assignee hereof (Cognex Corporation).

Figure 3B:
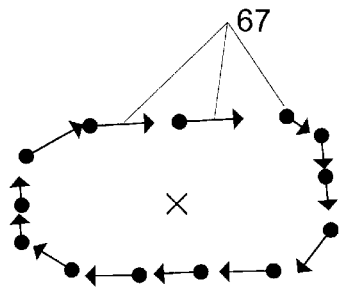
Figure 5A:
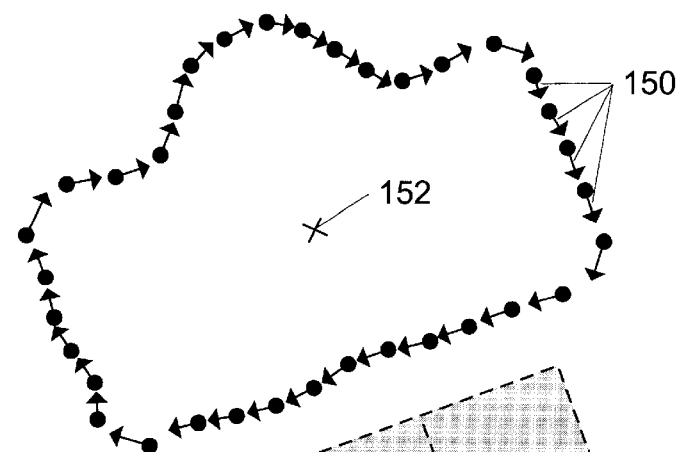

Operation of step 34 on object 62 is shown is illustrated in FIG. 3B. There, the boundary is depicted as a series of arrows, each representing the location and orientation of a corresponding data point 67 on the boundary. Likewise operation of that step on composite object 92/98 is illustrated in FIG. 5A, where the boundary is depicted as a series of arrows, each representing the location and orientation of a corresponding data point 150 on the boundary.

In step 36, the method estimates a coarse position and orientation of the object in the image, e.g., object 62 or composite object 92/98. It also estimates an error in those estimates. Preferably, the position is the center of mass 69 (FIG. 3B), 152 (FIG. 5A), which is determined in the conventional manner known in the machine vision art.

The orientation of the objects 62, 92/98 is preferably determined from histogram of boundary point angles (e.g., picking an angle corresponding to the peak in the histogram), in a manner known in the art. Other techniques for determining the coarse position and orientation of an object are well known in the art. The operator may input estimates of errors in orientation, though, they are typically provided by the corresponding machine vision tool (e.g., angle finder).

Estimates of the errors in position may also be input by the operator or provided by the corresponding machine vision tool (e.g., connectivity analysis or "blob"). For example, a given vision tool may have a known error of 2 pixels. Alternatively, such a tool may return an error estimate that is based on the number of points utilized in analyzing the object image. This sort of error is occasionally referred to below as "positional uncertainty from coarse location," though, it covers a broad range of errors, e.g., error arising from coarse part location step 36, error arising from the image acquisition process itself (e.g., distortion, skew, etc.), and error arising from uncertainty as to the location of the actual object in the "real world" (e.g., positioning error associated with a conveyor belt or motion stage on which the actual object resides), among others.

An additional source of error, which is occasionally referred to below as "positional uncertainty from an extraneous object," refers to potential errors in center-of-mass and other positional determinations resulting from the possibility that objects not of interest, such as a pick-up nozzle, or other artifact in the image, may be indistinguishable from the object of interest. As discussed below in connection with FIGS. 4A–4H, this sort of error can be determined in the conventional way from the expected geometry of the object of interest (e.g., an SMD chip 62, 92) in view of potential perturbations in the boundary of its image resulting from an artifact, such as nozzle silhouette 98. Those skilled in the art will appreciate that only conservative upper bounds of the perturbations need be taken into account.

In step 38, the method creates bounding boxes for correlating boundary points of the object in the image, e.g., 62, 92/98, with edges defining the perimeter of the actual object that the image depicts—or, preferably, with corresponding peripheral edges of a template or model of that actual object.

Figure 3C:
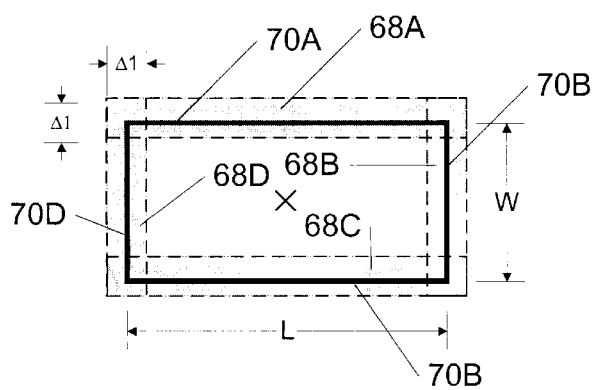

Bounding boxes 68A–68D, sized to accomodate dimensional variability, e.g., manufacturing tolerances, in the actual object, and sized to accomodate other non-imaging related variations in the size of the actual object, are depicted in FIG. 3C. Those bounding boxes 68A–68D also also accomodate positional uncertainty in the coarse location.

Thus, for example, bounding box 68A corresponds to the top edge 70A of the model, shown here as a W×L rectangle that is sized in accord with nominal dimensions of the actual object (e.g., SMD chip) being imaged. The bounding box 68A has a width Δ1 that corresponds to the manufacturing tolerances of the modeled object (e.g., typically, ten to twenty percent of the nominal width), plus the positional uncertainty from coarse location:

$$\Delta 1 = \text{manf. tol.} + \text{pos. uncert. from coarse location}$$

As noted above, positional uncertainty from coarse location can be input by the operator or provided by the coarse location machine vision tool (e.g., connectivity analysis or "blob"). It can include components covering errors arising from any of the factors above, such as coarse part location error, image acquisition error, real-world location error, etc.

The bounding box 68A has a length that also corresponds to the manufacturing tolerances of the modeled object, plus the positional uncertainty from coarse location. Though the manufacturing tolerances in L typically differ from those in W, for convenience of illustration, the combined "delta" resulting from tolerances in L and positional uncertainty is also shown as being Δ1. Hence, the overall length of illustrated bounding box 68A is L+Δ1.

As shown in FIG. 3C, bounding boxes 68B, 68C, and 68D, which correspond to the right side edge, bottom edge and left side edge of the actual object are constructed and sized similarly to box 68A.

Figure 4E:
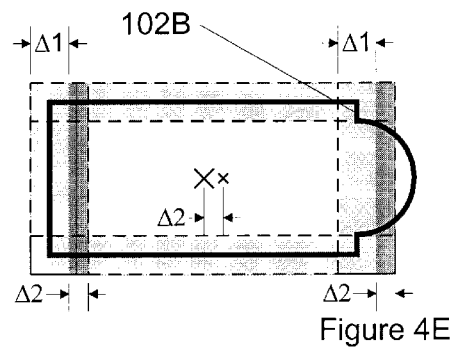
Figure 4B:
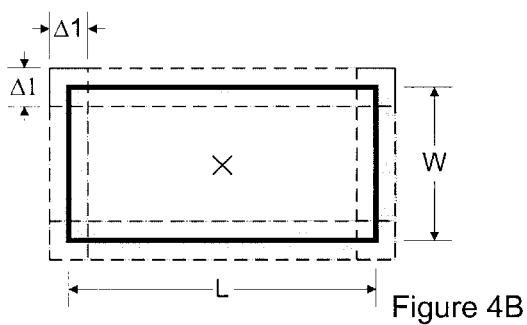
Figure 4F:
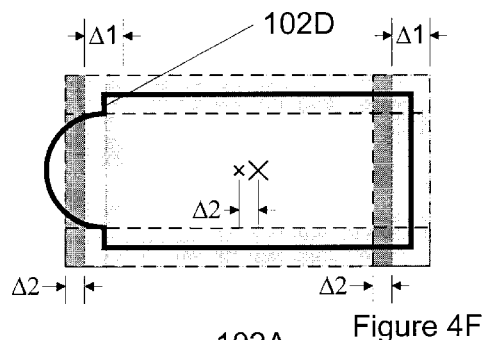
Figure 4C:
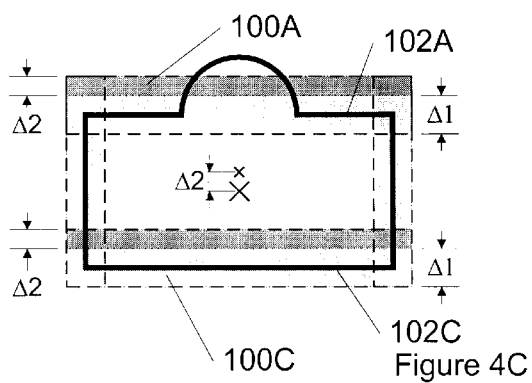
Figure 4G:
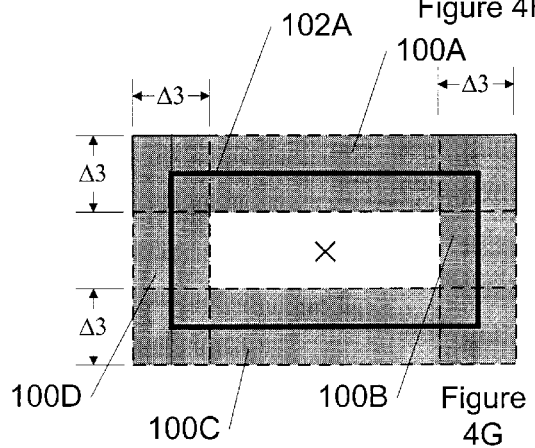

Bounding boxes 100A–100D, depicted in FIG. 4G, are constructed to accomodate manufacturing tolerances (and other non-imaging related variations in size) and positional uncertainty resulting from coarse location. Those bounding boxes 100A–100D also accomodate positional uncertainty resulting from an extraneous object 98. As evident in the discussion above, this latter type of uncertainty arises from the possibility that an apparent object of interest in the image may indeed be a composite object 92/98, a portion 92 of which is truly of interest and another portion 98 of which is not of interest. Put yet another way, the bounding boxes 100A–100D assist in distinguishing portions of a composite object 92/98 that are of interest from those that are not.

Thus, for example, bounding box 100A corresponds to the top edge 102A of the model, shown here as a W×L rectangle that is sized in accord with nominal dimensions of the actual object (e.g., SMD chip) being imaged. The bounding box 102A has a width Δ3 that corresponds to the manufacturing tolerances and coarse location positional uncertainty (together, Δ1, as above) plus the additional positional uncertainty resulting extraneous object 98 (Δ2):

Δ3 = Δ1 + Δ2
 = (manf. tol. +pos. uncert. from coarse location) +
 pos. uncert. from indist. obj.

The bounding box 100A has a length that also corresponds to the sum of the manufacturing tolerances, the positional uncertainty due to coarse location, and the positional uncertainty due to the extraneous object 98. Though this sum typically differs from that applied in the width dimension, for convenience of illustration, this "delta" is presented as being the same in both the length and width dimensions. Hence, the overall length of illustrated bounding box 100A is L+Δ3.

As shown in FIG. 4G, bounding boxes 100B, 100C, and 1008D, which correspond to the right side edge, bottom edge and left side edge of the actual object are constructed and sized similarly to box 100A.

FIGS. 4B–4G illustrate how the "delta" of the bounding boxes 100A–100D is determined. At the outset, referring to FIG. 4B the delta is assumed to be sized in accord with that described above in connection with FIG. 3C. Particularly, it can be sized in accord with errors arising from any coarse part location error, image acquisition error, real-world location error, etc.

As shown in FIG. 4C, the delta of the bounding boxes 100A, 100C is widened by an amount Δ2 to accomodate the possibility that the coarse position estimate of the object of interest 92 may be adversely affected by data points from the extraneous object 98. In the event such a boundary were processed by conventional machine vision tools, e.g., of the type discussed above, for coarse part location, the reported center-of-mass (and, thus, position) of the object 92 of interest would be erroneously shifted "upward" by an amount Δ2. That shifting is shown in FIG. 4C, where the true center of mass of the object of interest 92 is represented by a large X, while the shifted center of mass is represented by a small x.

Figure 4D:
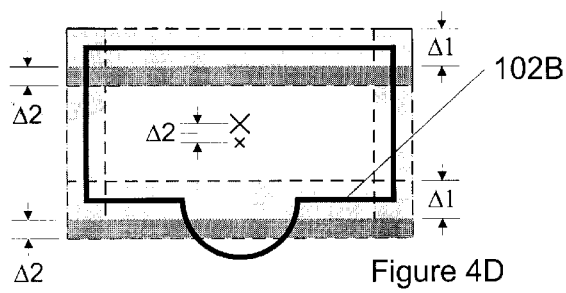

The value of Δ2 may be input by the operator, calculated at run-time or incorporated into data structures or source code. Preferably, it is the minimum deviation between the composite object's 92/98 center of mass and the object of interest's 92 center of mass. However, the illustrated method will still perform in the desired manner if Δ2 is not set at the optimal level (albeit, with decreased performance). Δ2 can be determined from the geometry of the potential composite object 92/98 boundary:

$$CM_{composite} = \frac{(CM_{protrusion} * AREA_{protrusion}) + (CM_{object} * AREA_{object})}{AREA_{protrusion} + AREA_{object}}$$

$$\Delta 2 = CM_{composite} - CM_{object}$$

where, $CM_{composite}$ is the center of mass of the composite object 92/98;

$CM_{protrusion}$ is the maximum predicted extent of the center of mass of the protruding portion of the extraneous object 98;

$AREA_{protrusion}$ is the maximum predicted area of the protruding portion of the extraneous object 98;

$CM_{object}$ is the center of mass of the object of interest 92;

$AREA_{object}$ is the area of the object of interest 92;

As shown in FIGS. 4D–4F, the method attends to the possibility that boundaries 102B, 102C and 102D may themselves include data points from the object of interest 92 and the extraneous object 98 by further widening of the boundary boxes 100A–100D, as illustrated.

Figure 4H:
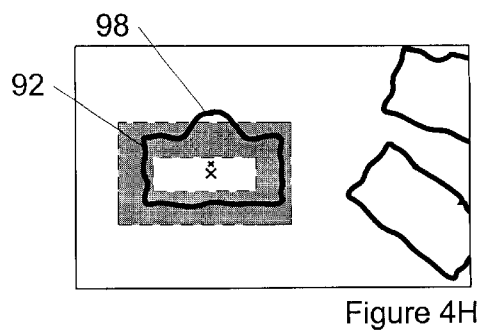

In step 40 (FIG. 2), the method positions the bounding boxes over the object 62, 92/98 in the image, using the coarse center of mass of the object as a guide. This is illustrated in FIG. 4H, where bounding boxes 100A–100D, constructed as discussed above, are positioned over the center of mass "x" of the composite object 92/98. As suggested by FIG. 4H, by widening the delta function by from Δ1 to Δ1+Δ2, the illustrated method generates boundary boxes sufficiently large to cover all boundary points of object 92, even if its apparent coarse position or center of mass (x, X) is shifted by inclusion of extraneous boundary data points from extraneous object 98. As discussed below, the method removes those extraneous data points if their orientations deviate from the expected angle (as determined by the model image) or if they are not sufficiently aligned with similarly situated data points.

Figure 3D:
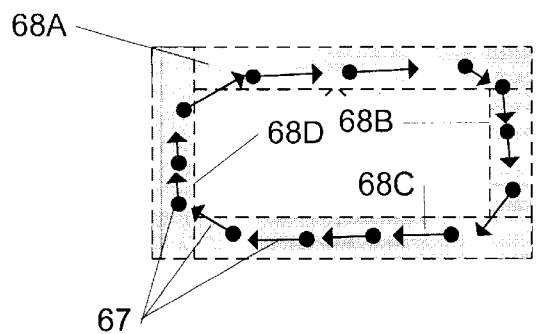
Figure 5B:
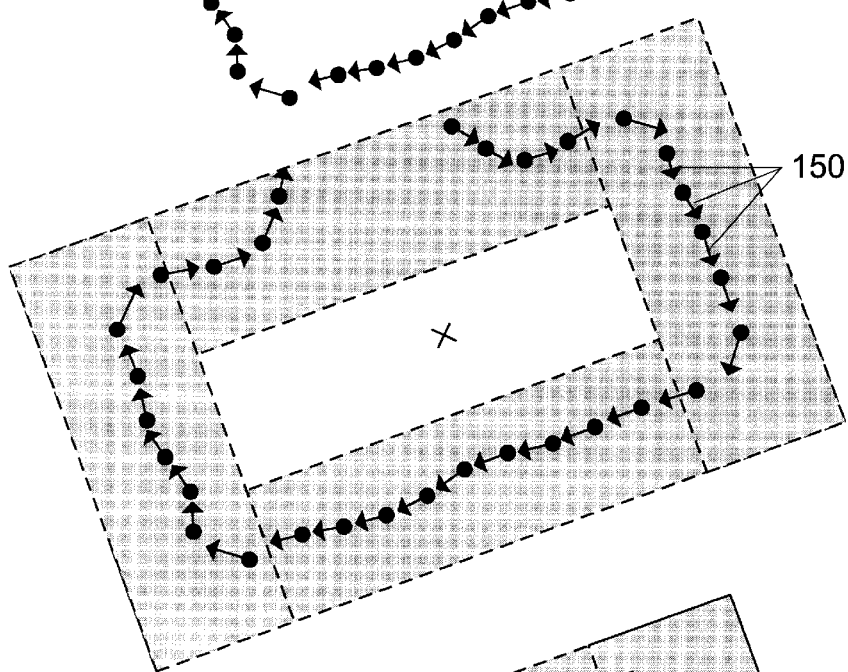

The effects of step 40 are also illustrated in FIG. 3D, showing positioning of bounding boxes 68A–68D over boundary points 67 using their center of mass "x" as a guide. The effects of step 40 are also shown in FIG. 5B, showing positioning of bounding boxes 100A–100D over boundary points 150 using their center of mass 152 as a guide.

Figure 3E:
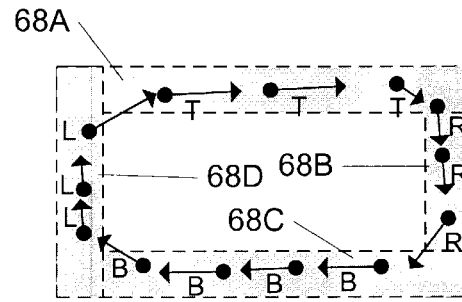

In one embodiment of the invention, the method categorizes boundary points of the object 62 in the image as corresponding with edges of the real world object, or its model 70A–70D, if those points lie in the corresponding bounding boxes 68A–68D. Thus, in accord with steps 42, 46 and as shown in FIG. 3E, the method identifies points "T" as residing in bounding box 68A and, therefore, as corresponding with top edge 70A of the model. Likewise, it identifies points "R" as residing in bounding box 68B and, therefore, corresponding with right side 70B of the model; points "B" as residing in bounding box 68C and, therefore, corresponding with bottom 70C of the model; and points "L" as residing in bounding box 68D and, therefore, corresponding with left side 70D of the model. Any points lying outside the bounding boxes 68A–68D are ignored.

According to this embodiment of the invention, any point lying simultaneously in two bounding boxes can be ignored, or assigned to one of those boxes based on the association of its closest neighboring point, or assigned to one of those boxes based on its angle, as discussed below.

Figure 3F:
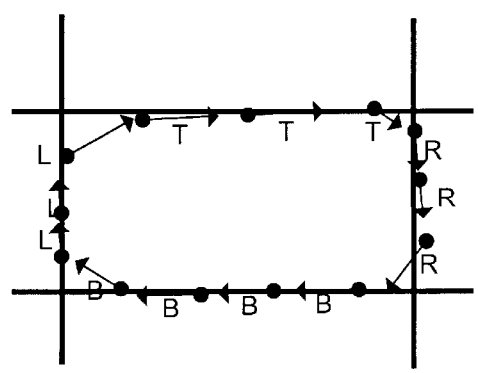

In further accord with this embodiment of the invention, once the boundary points 67 have been categorized with their corresponding edges 70A–70D of the model, the method determines a characteristic of the object 62 in the image and/or of its real-world counterpart. Thus, for example, in steps 48 the method fits lines to similarly situated points. That is, as shown in FIG. 3F, it fits one line to all points T, another line to all points B, and so forth. This fitting can be done in image space, in model space or in physical space, as desired. In addition to (or in lieu of) fitting lines, in step 52 the method can analyze the categorized points directly to determine characteristics of the object 62. For example, from those points the method can make an accurate determination of the object's center of mass, its orientation, etc. Again, this can be done in image space, model space or in physical space, as desired. Still alternatively (or in addition), in step 52 the method can output the coordinates of the boundary points. Characteristics determined in steps 48 and 52 can be generated for display or output to the operator, or they can be output for use by another machine vision tool (not shown).

In another embodiment of the invention, the method categorizes boundary points of the composite object 92/98 in the image as corresponding with edges of the real world object, or its model 102A–102D, if those points lie in the corresponding bounding boxes 100A–100D and if those points are oriented in the manner of the edges to which they correspond.

Figure 5C:
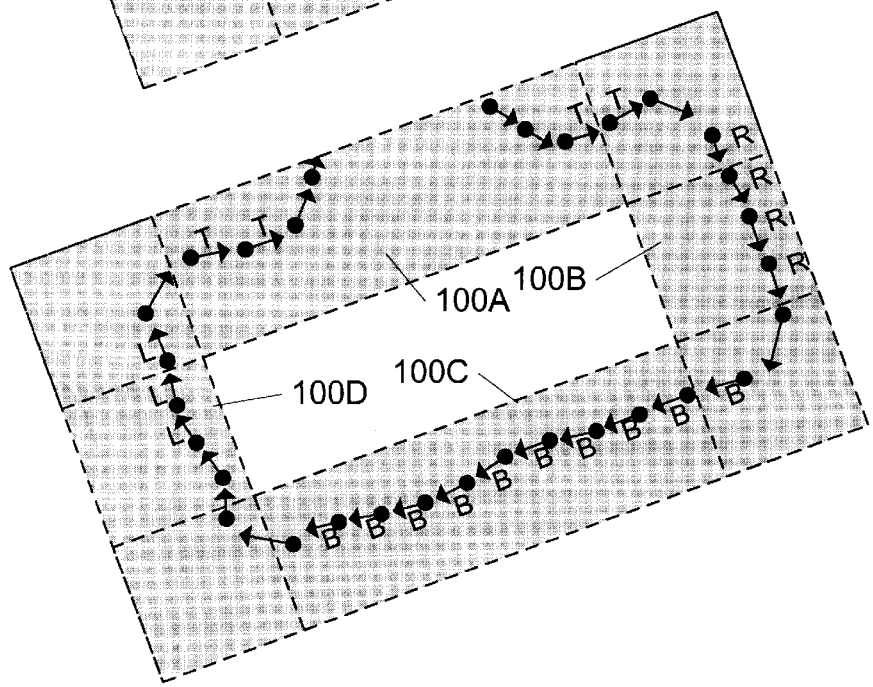

Thus, in accord with step 42 and as shown in FIG. 5C, the method identifies boundary points that reside in bounding box 100A and, therefore, that potentially correspond with top edge 102A of the model. In step 44, the method compares the orientations of each of those points with the expected orientation of the corresponding edge 102A. Prior to making that comparison, the method "normalizes" the angles of the boundary points by subtracting the coarse angular orientation determined in step 36. It then determines whether the "normalized" angle of each point is within a specified tolerance (e.g., +/–10°) of the expected angular orientation of edge 102A (e.g., 0°). If so, in step 46 the method categorizes the points as corresponding with the edge 102A. If not, the point is ignored.

Steps 42–46 are similarly applied to identify boundary points corresponding to bounding boxes 100B–100D and, thereby, to edges 102B–102D of the model. As above, any points lying outside the bounding boxes 102A–102D are ignored. Any points lying in two bounding boxes are categorized only if their angular orientations compare favorably with those of the corresponding edge 102A–102D.

Results of application of steps 42–46 to points 150 are shown in FIG. 5C. There, points T are categorized as corresponding with edge 102A; points R, with edge 102B; points B, with edge 102C; and points L, with edge 102D. Those skilled in the art will appreciate that, unlike the example above, points at the corners of the boundary are ignored. In addition, those points contributed by the extraneous object are ignored. The results of this phase of processing are redrawn in FIG. 5D, without the bounding boxes.

Comparing the results shown in FIG. 5D with the original boundary points shown in FIG. 5A, it is readily apparent that the invention is quite effective at removing boundary points that might interfere with accurate determination of characteristics of the desired object 92. Particularly, it removes odd-angled corner points and points that are contributed by the extraneous object.

In further accord with this embodiment of the invention, once the boundary points 150 have been associated with edges 102A–102D of the model, the method can use optional steps 48–50 to identify and discard categorized boundary points that are out of line with similarly situated points. Particularly, in step 48, the method fits lines 155A–155D to respective groups of T, R, B, and L points. This fitting can be via a least squares technique or any other known method for fitting a line to points. Moreover, it can be done in image space, model space or physical space, as desired. In step 50, any points lying more than a specified distance (e.g., more than 3σ) from the corresponding line are discarded.

In step 52 the method can analyze the categorized points to determine characteristics of the object 92. For example, based on those points, the method can make an accurate determination of the object's 92 center of mass, its orientation, etc. As above, this can be done in image space, model space or physical space, as desired. Still alternatively, or in addition, in step 52, the method can output the coordinates of the boundary points. Lines identified in step 48, or other characteristics identified in step 52, can be generated for display or output to the operator, or they can be output for use by another machine vision tool (not shown).

In yet another embodiment of the invention, the method categorizes boundary points of the object 62, 92/98 in the image as corresponding with edges of the real world object, or its model 70A–70D, 102A–102D, if those points are oriented in accord with the expected angular orientation of those edges. This embodiment of the invention can—though it need not—rely on bounding boxes 68A–68D, 100A–100D, to facilitate matching boundary points with edges; however, unlike the embodiments described above it does not ignore points that fall outside the bounding boxes.

According to this embodiment of the invention, after step 36, the method uses step 44 to compare the orientations of each of the boundary points with the expected orientations of the edges 70A–70D, 102A–102D. Prior to making those comparisons, the method "normalizes" the angles of the boundary points by subtracting the coarse angular orientation determined in step 36. It then determines whether the "normalized" angle of each point is within a specified tolerance (e.g., +/–10°) of any of the edges. If so, in step 46 the method categorizes the points as corresponding with that edge. If the normalized angle of a boundary point is within tolerance of two edges, e.g., the top and bottom of a model, the method further categorizes the point based on its location vis-a-vis the center of mass. Thus, for example, points aligned with the top and bottom edges, but residing "above" the center of mass are categorized with the top edge). Points whose normalized orientations are not within tolerance of any edge are ignored.

Once the points have been uniquely categorized, line-fitting and object categorization can be performed as discussed above.

Those skilled in the art will appreciate that the invention provides several independent, yet synergistically cooperative, mechanisms for matching boundary points in an image with edges in a real-world object—and, thereby, for determining characteristics of the objects. Those mechanisms are boundary boxes, angle-matching and line-fitting. As evident in the discussion above, boundary boxes and angle-matching can be used independently to provide the desired matching function. Depending on the tightness of the bounding boxes or tolerance of the angle-matching, line-fitting can be used to further eliminate bad points and, thereby, to improve boundary point-to-edge categorizations.

Moreover, bounding boxes can be used with angle-matching and, optionally, with line-fitting. For example, the bounding boxes can be narrowed or widened to capture more potential edge points. Angle-matching can then be applied to rapidly eliminate corners and data points contributed by extraneous objects (e.g., suction nozzles). This can be followed by line-fitting to eliminate noise or other odd points.

Described herein are machine vision methods meeting the objects set forth above. Those skilled in the art will appreciate that the embodiments are illustrative and that other embodiments incorporating modifications thereto fall within the scope of the invention. Thus, for example, the invention can be applied to analysis of non-rectangular objects, e.g., triangular, octagonal, and so forth. By way of further example, the bounding boxes need not be rectangular but, rather, can be shaped in any manner that faciliates identifying boundary points that correspond with edges. By way of still further example, the invention can be applied to analysis of images generated under any lighting condition, as well as images that are generated artificially.

In view of the foregoing, what I claim is:

1. A method of determining a characteristic of an object in an image, comprising the steps of
   A. finding, in the image, points on a boundary of the object;
   B. identifying, in the image, plural bounding boxes corresponding to each of plural respective edges of the object;
   C. determining a correspondence, if any, between points in the image on the boundary of the object and respective edges of the object, such determination being based on at least (i) locations and orientations in the image of the points on the boundary of the object, and (ii) locations in the image of the plural bounding boxes;
   D. determining a characteristic of the object based on those points in the image on the boundary of the object that correspond to edges of the object.

2. A method according to claim 1, wherein step (B) includes the step of identifying bounding boxes in the image corresponding to any of a top, bottom and side edges of the object.

3. A method according to claim 1, wherein step (B) includes the steps of
   determining (i) at least a coarse location of the object in the image, and (ii) an estimate of uncertainty of that location; and
   identifying the bounding boxes in the image as a function of at least the coarse location and the estimate of the uncertainty thereof.

4. A method according to claim 3, wherein step (B) includes the step of determining the coarse location of the object in the image as a function of its center of mass in the image.

5. A method according to claim 3, wherein step (B) includes the step of determining the estimate of the uncertainty of the coarse location as a function of characteristics of features in the image other than the object.

6. A method according to claim 5, wherein step (B) includes the step of determining the estimate of the uncertainty of the coarse location as a function of an estimated size of a device for handling the object, which device may appear in the image along with the object.

7. A method according to claim 6, wherein step (B) includes the step of determining the estimate of the uncertainty of the coarse location as a function of an estimated size of a pick-up nozzle that may appear in the image along with the object.

8. A method according to claim 3, wherein step (B) includes determining the estimated uncertainty as a function of potential variations in the size of the object that are not related imaging.

9. A method according to claim 1, wherein step (C) includes the steps
   determining the locations and orientations in the image of points on the boundary of the object,
   for each of at least selected ones of those points: (i) determining which bounding box, if any, in the image the point resides in, (ii) comparing the orientation of the point with an expected orientation of the edge of the object corresponding to that bounding box.

10. A method according to claim 9, wherein step (C) includes the step of identifying as corresponding to a respective edge of the object a point that (i) resides in a bounding box corresponding to that edge, (ii) has an orientation that compares favorably with the expected orientation of that edge.

11. A method according to claim 10, wherein step (C) includes the steps of
    fitting a line to the points in the image that correspond to a respective edge of the object, and
    identifying as not corresponding to an edge any of those points that resides more than a specified distance from that line.

12. A method according to claim 9, wherein step (C) includes the step of identifying as not corresponding to an edge of the object a point in the image that (i) is not in any bounding box, or (ii) does not have an orientation that compares favorably with the expected orientation of the edge of the object corresponding to the bounding box in which the point resides.

13. A method according to claim 1, wherein step (D) includes the step of using point-line correspondences to fit to respective edges of a model of the object those points in the image that correspond to those edges.

14. A method according to claim 13, wherein step (D) includes the step of determining a characteristic of the object from the points subsequent to their being fit to the respective edges of the model.

15. A method according to claim 13, wherein step (D) includes the step of determining as the characteristic of the object any of a position, orientation, size, center of mass, and boundary of the object.

16. A method of determining a characteristic of a backlit rectangular object in an image, comprising the steps of
    A. finding in the image points on a boundary of the object;
    B. determining at least a coarse location of the object in the image, and an estimate of uncertainty of that location;
    C. identifying as a function of at least the coarse location and the estimate of the uncertainty thereof bounding boxes in the image corresponding to any of a top, bottom and side edges of the object;
    D. determining the locations and orientations in the image of points on the boundary of the object, and for each of at least selected ones of those points (i) determining which bounding box, if any, in the image the point resides in, (ii) comparing the orientation of the point with an expected orientation of the edge of the object corresponding to that bounding box;
    E. identifying as corresponding to a respective edge of the object a point that (i) resides in a bounding box corresponding to that edge, (ii) has an orientation that compares favorably with the expected orientation of that edge;
    F. determining a characteristic of the object based on those points in the image on the boundary of the object that correspond to edges of the object.

17. A method according to claim 16, wherein step (A) includes the step of determining a region of interest in the image and performing the remaining steps of the method on that region of interest.

18. A method according to claim 17, wherein step (A) includes the step of determining that region of interest based on any of an estimated position and uncertainty of the object in the image.

19. A method according to claim 16, wherein step (A) includes the step of smoothing the region of interest prior to performing the remaining steps the remaining steps of the method thereon.

20. A method according to claim 16, wherein step (B) includes the step of determining the coarse location of the object in the image as a function of its center of mass in the image.

21. A method according to claim 16, wherein step (B) includes the step of determining the estimate of the uncertainty of the coarse location as a function of characteristics of other features of the image.

22. A method according to claim 21, wherein step (B) includes the step of determining the estimate of the uncertainty of the coarse location as a function of an estimated size of a device for handling the object, which device may appear in the image along with the object.

23. A method according to claim 22, wherein step (B) includes the step of determining the estimate of the uncertainty of the coarse location as a function of an estimated size of a pick-up nozzle that may appear in the image along with the object.

24. A method according to claim 16, wherein step (E) includes the steps of fitting a line to the points in the image that correspond to a respective edge of the object, and identifying as not corresponding to an edge any of those points that resides more than a specified distance from that line.

25. A method of determining a characteristic of an object in an image, comprising the steps of A. finding, in the image, points on a boundary of the object;

B. identifying, in the image, plural bounding boxes corresponding to each of plural respective edges of the object;

C. determining a correspondence, if any, between points in the image on the boundary the object and respective edges of the object, such determination being based on at least (i) locations in the image of the points on the boundary of the object, and (ii) locations in the image of the plural bounding boxes;

D. determining a characteristic of the object based on those points in the image on the boundary of the object that correspond to edges of the object.

26. A method of determining a characteristic of an object in an image, comprising the steps of A. finding, in the image, points on a boundary of the object;

B. determining angular orientations of the points on the boundary of the object;

C. determining a correspondence, if any, between points in the image on the boundary of the object and respective edges of the object, such determination being based on at least (i) the angular orientations of the points on the boundary of the object, and (ii) the expected angular orientations of the edges of the object; and D. determining a characteristic of the object based on those points in the image on the boundary of the object that correspond to edges of the object.

* * * * *